(12) United States Patent
Laird et al.

(10) Patent No.: US 7,998,320 B2
(45) Date of Patent: *Aug. 16, 2011

(54) COATED ARTICLE WITH HIGH VISIBLE TRANSMISSION AND LOW EMISSIVITY

(75) Inventors: Ronald E. Laird, Dexter, MI (US); Carole Laird, legal representative, Dexter, MI (US); Uwe Kriltz, Jena (DE)

(73) Assignees: Guardian Industries Corp., Auburn Hills, MI (US); Centre Luxembourgeois de Recherches pour le Verre et la Ceramique S.A. (C.R.V.C.), Grand Duche de Luxembourg ( * ) Notice: Subject to any disclaimer, the term of this patent is extended or adjusted under 35 U.S.C. 154(b) by 931 days.

This patent is subject to a terminal disclaimer.

(21) Appl. No.: 11/086,327

(22) Filed: Mar. 23, 2005

(65) Prior Publication Data
US 2005/0164015 A1 Jul. 28, 2005

Related U.S. Application Data

(60) Continuation of application No. 10/921,884, filed on Aug. 20, 2004, now Pat. No. 6,916,408, which is a division of application No. 09/978,184, filed on Oct. 17, 2001, now Pat. No. 6,936,347.

(51) Int. Cl.
*C23C 14/34* (2006.01)
(52) U.S. Cl. .......... 204/192.26; 204/192.27; 204/192.28
(58) Field of Classification Search ............. 204/192.26, 204/192.27, 192.28
See application file for complete search history.

(56) References Cited

U.S. PATENT DOCUMENTS

| 3,682,528 | A | 8/1972 | Apfel et al. |
| 4,010,304 | A | 3/1977 | Cohen |
| 4,413,877 | A | 11/1983 | Suzuki et al. |
| 4,565,719 | A | 1/1986 | Phillips et al. |
| 4,898,789 | A | 2/1990 | Finley |

(Continued)

FOREIGN PATENT DOCUMENTS

DE 42 11 363 10/1993

(Continued)

OTHER PUBLICATIONS

U.S. Appl. No. 10/921,884, filed Aug. 20, 2004.

(Continued)

*Primary Examiner* — Rodney G McDonald
(74) *Attorney, Agent, or Firm* — Nixon & Vanderhye P.C.

(57) ABSTRACT

A coated article that can be used in applications such as insulating glass (IG) units, so that resulting IG units can achieve high visible transmission of at least 70% (e.g., when using clear glass substrates from 1.0 to 3.5 mm thick), combined with at least one of: (a) SHGC no greater than about 0.45, more preferably no greater than about 0.40; (b) SC no greater than about 0.49, more preferably no greater than about 0.46; (c) chemical and/or mechanical durability; (d) neutral transmissive color such that transmissive a* is from −5.0 to 0 (more preferably from −3.5 to −1.5), and transmissive b* is from −2.0 to 4.0 (more preferably from 1.0 to 3.0); and (e) neutral reflective color from the exterior of the IG unit (i.e., $Rg/R_{out}$) such that reflective a* is from −3.0 to 2.0 (more preferably from −2.0 to 0.5), and reflective b* is from −5.0 to 1.0 (more preferably from −4.0 to −1.0). In certain example non-limiting embodiments, coated articles herein comprise: substrate/$TiO_x$/$ZnO_x$/Ag/$NiCrO_x$/$SnO_x$/$ZnO_x$/Ag/$NiCrO_x$/$SnO_x$/$Si_xN_y$.

8 Claims, 4 Drawing Sheets

U.S. PATENT DOCUMENTS

| | | | |
|---|---|---|---|
| 5,153,054 A | 10/1992 | Depauw et al. | |
| 5,264,099 A | * 11/1993 | Szczyrbowski et al. | 204/192.27 |
| 5,298,048 A | 3/1994 | Lingle et al. | |
| 5,302,449 A | 4/1994 | Eby et al. | |
| 5,376,455 A | 12/1994 | Hartig et al. | |
| 5,425,861 A | 6/1995 | Hartig et al. | |
| 5,557,462 A | 9/1996 | Hartig et al. | |
| 5,563,734 A | 10/1996 | Wolfe et al. | |
| 5,595,825 A | * 1/1997 | Guiselin | 428/428 |
| 5,688,585 A | 11/1997 | Lingle et al. | |
| 5,770,321 A | 6/1998 | Hartig et al. | |
| 5,800,933 A | 9/1998 | Hartig et al. | |
| 5,821,001 A | 10/1998 | Arbab et al. | |
| 5,834,103 A | 11/1998 | Bond et al. | |
| 5,935,702 A | 8/1999 | Macquart et al. | |
| 5,942,338 A | 8/1999 | Arbab et al. | |
| 5,962,115 A | 10/1999 | Zmelty et al. | |
| 5,965,246 A | 10/1999 | Guiselin et al. | |
| 6,045,896 A | 4/2000 | Boire et al. | |
| 6,060,178 A | 5/2000 | Krisko | |
| 6,231,999 B1 | 5/2001 | Krisko | |
| 6,261,693 B1 | 7/2001 | Veerasamy | |
| 6,277,480 B1 | 8/2001 | Veerasamy et al. | |
| 6,292,302 B1 | 9/2001 | Krisko et al. | |
| 6,354,109 B1 | 3/2002 | Boire et al. | |
| 6,355,334 B1 | 3/2002 | Rondeau et al. | |
| 6,398,925 B1 | 6/2002 | Arbab et al. | |
| 6,602,608 B2 | 8/2003 | Stachowiak | |
| 6,686,050 B2 | 2/2004 | Lingle et al. | |
| 6,802,943 B2 | 10/2004 | Stachowiak | |
| 6,916,408 B2 | 7/2005 | Laird et al. | |
| 6,936,347 B2 | 8/2005 | Laird et al. | |
| 7,025,859 B2 | 4/2006 | Stachowiak | |
| 2002/0136905 A1 | 9/2002 | Medwick et al. | |
| 2003/0148115 A1 | 8/2003 | Glenn et al. | |

FOREIGN PATENT DOCUMENTS

| | | |
|---|---|---|
| EP | 0 870 601 | 10/1998 |
| EP | 0 963 960 | 12/1999 |
| EP | 1 174 397 | 1/2002 |

OTHER PUBLICATIONS

U.S. Appl. No. 09/978,184, filed Oct. 17, 2001.

International Search Report dated Mar. 17, 2003.

* cited by examiner

COATED ARTICLE WITH HIGH VISIBLE TRANSMISSION AND LOW EMISSIVITY

This application is a continuation of application Ser. No. 10/921,884, filed Aug. 20, 2004 now U.S. Pat. No. 6,916,408, which is a divisional of application Ser. No. 09/978,184 filed Oct. 17, 2001 now U.S. Pat. No. 6,936,347, the entire contents of which are hereby incorporated herein by reference in this application.

This invention relates to a coated article, and a method of making the same. In particular, this invention relates to a coated article having high visible transmission (e.g., absent tempering, heat bending, or other significant heat treatment), neutral color (transmissive and/or reflective), durability (mechanical and/or chemical), and/or low emissivity (low-E) characteristics, and a method of making the same.

BACKGROUND OF THE INVENTION

Coated articles are known in the art. For example, see U.S. Pat. No. 5,800,933 to Hartig (the '933 patent). The '933 patent discloses, inter alia, a layer stack of: glass substate/$TiO_2/Si_3N_4$/NiCr/Ag/NiCr/$Si_3N_4$. In columns 22-25 of the '933 patent, it can be seen from non-heat-treatable Example A that the resulting insulating glass (IG) unit used 2.3 mm glass sheets and had a visible transmission of 69.5%, a shading coefficient (SC) of 0.48, and thus a solar heat gain coefficient (SHGC) of about 0.418 (i.e., SC=SHGC/0.87). Even using these thin clear glass sheets (2.3 mm thick), the IG unit was still not able to achieve a visible transmission of at least 70%; this is unfortunate in certain non-limiting situations. Moreover, it would sometimes be desirable to have a SC and/or SHGC that was lower than those listed above, for solar management reasons that will be appreciated by those skilled in the art.

It will be appreciated by those skilled in the art that there exists a need in the art for a coated article that can be used in monolithic applications and/or applications such as IG units, so that resulting IG units can achieve high visible transmission (e.g., visible transmission of at least 70%) combined with one or more of (a) SHGC no greater than about 0.45, more preferably no greater than about 0.40; (b) SC no greater than about 0.49, more preferably no greater than about 0.46; (c) chemical and/or mechanical durability; (d) neutral transmissive color such that transmissive a* is from −5.0 to 0 (more preferably from −3.5 to −1.5), and transmissive b* is from −2.0 to 4.0 (more preferably from 1.0 to 3.0); and (e) neutral reflective color from the exterior of the IG unit (i.e., Rg/$R_{out}$) such that reflective a* is from −3.0 to 2.0 (more preferably from −2.0 to 0.5), and reflective b* is from −5.0 to 1.0 (more preferably from 4.0 to −1.0).

BRIEF SUMMARY OF THE INVENTION

An object of this invention is to provide a coated article that can be used in applications such as insulating glass (IG) units, so that resulting IG units can achieve high visible transmission of at least 70% (e.g., when using clear glass substrates from 1.0 to 3.5 mm thick), combined with at least one of: (a) SHGC no greater than about 0.45, more preferably no greater than about 0.40; (b) SC no greater than about 0.49, more preferably no greater than about 0.46; (c) chemical and/or mechanical durability; (d) neutral transmissive color such that transmissive a* is from −5.0 to 0 (more preferably from −3.5 to −1.5), and transmissive b* is from −2.0 to 4.0 (more preferably from 1 to 3.0); and (e) neutral reflective color from the exterior of the IG unit (i.e., Rg/$R_{out}$) such that reflective a* is from −3.0 to 2.0 (more preferably from −2.0 to 0.5), and reflective b* is from −5.0 to 1.0 (more preferably from 4.0 to −1.0).

Another object of this invention is to provide an article having a layer stack comprising: substrate/$TiO_x$/$ZnO_x$Ag/$NiCrO_x$/$SnO_x$/$ZnO_x$Ag/NiCrO/$SnO_x$$Si_xN_y$. In certain example non-limiting embodiments of this invention, such a layer stack may enable one or more of the above-listed objects and/or needs to be met.

Another object of this invention is to fulfill one or more of the above-listed objects and/or needs.

In certain example non-limiting embodiments of this invention, one or more of the above-listed objects and/or needs is/are satisfied by providing a coated article comprising:
a substrate;
a first dielectric layer supported by the substrate;
a lower contact layer comprising zinc oxide;
an infrared (IR) reflecting layer comprising silver;
an upper contact layer comprising at least one of an oxide of nickel, an oxide of chromium, and nickel chrome oxide; and
wherein the IR reflecting layer comprising silver is located between and in contact with the lower and upper contact layers.

In other example embodiments of this invention, one or more of the above-listed needs and/or objects is/are satisfied by providing an insulating glass (IG) window unit comprising:
first and second substrates spaced from one another,
a coating supported by the first substrate, the coating including first and second IR reflecting layers, each of the IR reflecting layers being sandwiched between and contacting a respective pair of contact layers;
wherein the coating has a sheet resistance ($R_s$) no greater than 3.5 ohms/square; and
wherein the IG window unit has a visible transmission of at least 70%, a solar heat gain coefficient (SHGC) no greater than 0.45, and outside reflective color characterized by a*$_{outside\ reflective}$ from −3.0 to 2.0 and b*$_{outside\ reflective}$ from −5.0 to 1.0.

In other example embodiments of this invention, one or more of the above-listed objects and/or needs is/are satisfied by providing a coated article comprising:
a coating or layer system supported by a glass substrate, the coating or layer system comprising from the glass substrate outwardly:
a) a titanium oxide inclusive layer;
b) a zinc oxide inclusive contact layer;
c) a silver inclusive layer;
d) a nickel chrome oxide inclusive layer;
e) a tin oxide inclusive layer;
f) a zinc oxide inclusive layer;
g) a silver inclusive layer;
h) a nickel chrome oxide inclusive layer; and
i) a silicon nitride inclusive layer;
wherein the coated article has a visible transmission of at least about 70% and the coating or layer system has a sheet resistance ($R_s$) of no greater than 5.0 ohms/square.

DETAILED DESCRIPTION OF EXAMPLE EMBODIMENTS OF THE INVENTION

Figure 1:
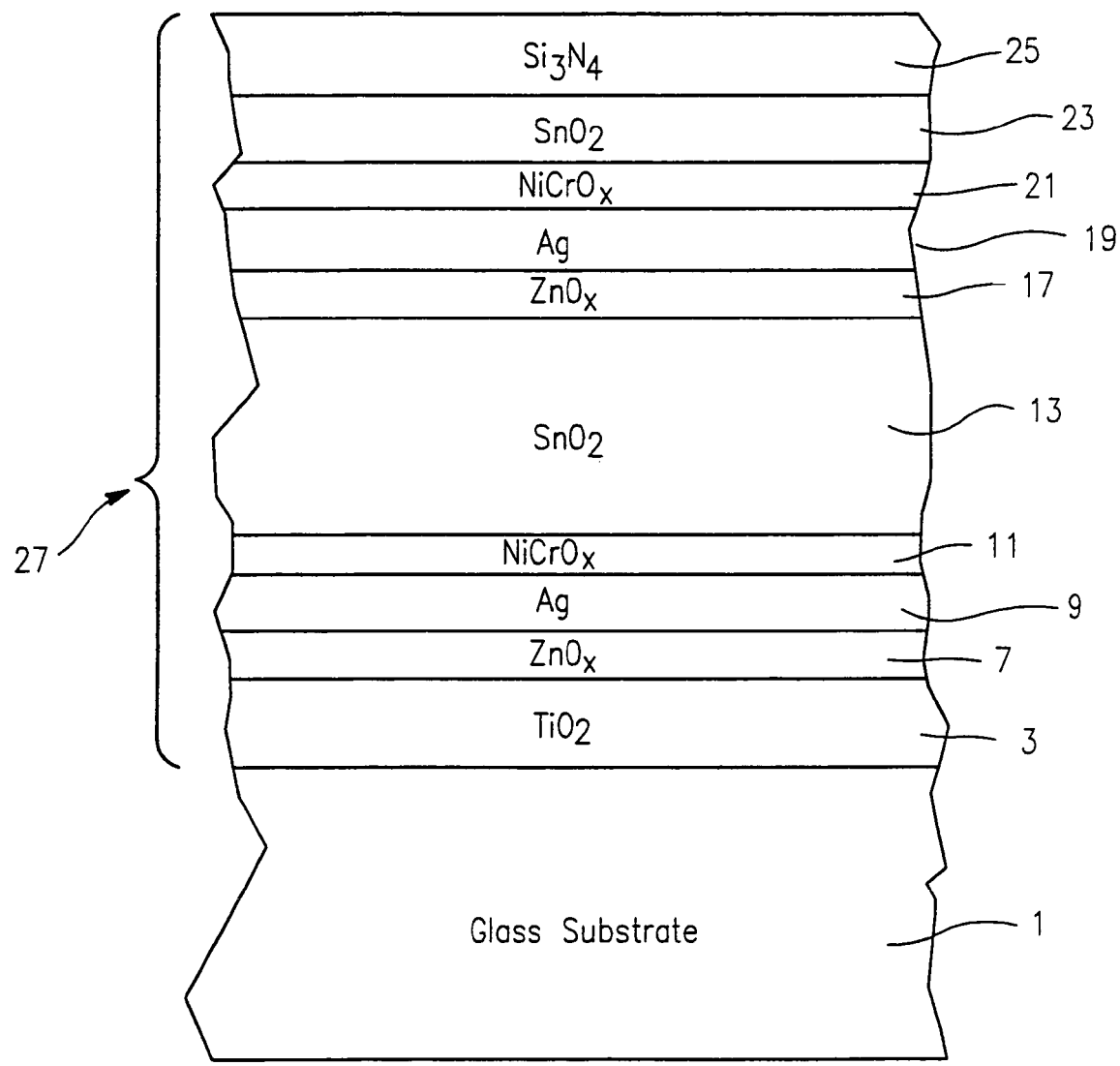
FIG. 1 is a cross sectional view of a coated article according to an example embodiment of this invention.

Referring now more particularly to the accompanying drawings in which like reference numerals indicate like parts throughout the several views.

Certain embodiments of this invention provide a low-E coating or layer system that may be used in applications such as insulating glass (IG) window units, vehicle windows, skylights, glass doors, and the like. Coated articles (e.g., monolithic or IG units) according to certain embodiments of this invention preferably have high visible transmission of at least 70% (e.g., when using clear glass substrates from 1.0 to 3.5 mm thick). In the example context of IG units, this high visible transmission is coupled with at least one of: (a) SHGC no greater than about 0.45, more preferably no greater than about 0.40; (b) SC no greater than about 0.49, more preferably no greater than about 0.46; (c) chemical and/or mechanical durability; (d) neutral transmissive color such that transmissive a* is from −5.0 to 0 (more preferably from −3.5 to −1.5), and transmissive b* is from −2.0 to 4.0 (more preferably from 1.0 to 3.0); and (e) neutral reflective color from the exterior of the IG unit (i.e., $Rg/R_{out}$) such that reflective a* (i.e., $a*_g$) is from −3.0 to 2.0 (more preferably from −2.0 to 0.5), and reflective b* (i.e., $b*_g$) is from −5.0 to 1.0 (more preferably from 4.0 to −1.0).

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and coating (or layer system) 27 provided on the substrate 1 either directly or indirectly. The coating (or layer system) 27 includes: first dielectric anti-reflection layer 3, first lower contact layer 7 (which contacts layer 9), first conductive metallic infrared (IR) reflecting layer 9, first upper contact layer 11 (which contacts layer 9), second dielectric layer 13 (which may be deposited in one or multiple steps in different embodiments of this invention), second lower contact layer 17 (which contacts layer 19), second conductive metallic IR reflecting layer 19, second upper contact layer 21 (which contacts layer 19), third dielectric layer 23, and finally fourth protective dielectric layer 25. The "contact" layers 7, 11, 17 and 21 each contact at least one IR reflecting layer (e.g., Ag layer). The aforesaid layers 3-25 make up low-E (i.e., low emissivity) coating 27 which is provided on glass or plastic substrate 1.

In certain preferred embodiments of this invention, first dielectric layer 3 may be of or include titanium oxide (e.g., $TiO_x$ where x is from 1.7 to 2.3, most preferably x is about 2.0). However, in other embodiments, layer 3 may be of or include silicon nitride ($Si_xN_y$ where x/y may be about 0.75 (i.e., $Si_3N_4$), or alternatively x/y may be from about 0.76 to 1.5 in Si-rich embodiments), aluminum oxide, tin oxide, zinc oxide, $BiO_x$, SiZrN, or any other suitable dielectric material. Preferably, first dielectric layer 3 has an index of refraction "n" of at least 1.7, and preferably from 2.0 to 2.7, and most preferably from 2.2 to 2.6. First dielectric layer 3 functions as an antireflection layer in certain embodiments of this invention.

Infrared (IR) reflecting layers 9 and 19 are preferably metallic and conductive, and may be made of or include silver (Ag), gold, or any other suitable IR reflecting material. However, metallic Ag is the material of choice for the IR reflecting layers 9 and 19 in certain example non-limiting embodiments of this invention. These IR reflecting layers help enable coating 27 to have low-E and/or good solar control characteristics.

The upper contact layers 11 and 21 (i.e., "upper" means the contact layers on top of the respective IR reflective layers 9, 19) are of or include nickel (Ni) oxide, chromium/chrome (Cr) oxide, or a nickel alloy oxide such as nickel chrome oxide ($NiCrO_x$), in preferred embodiments of this invention. The use of, for example, $NiCrO_x$ for/in these layers enables durability to be improved, compared to the use of certain other materials (e.g., compared to zinc oxide). $NiCrO_x$ layers 11 and/or 21 may be fully oxidized in certain embodiments of this invention (i.e., fully stoichiometric), or may be at least about 50% oxidized in other embodiments of this invention. While $NiCrO_x$ is a preferred material for upper contact layers 11 and 21, those skilled in the art will recognize that other materials may instead be used (e.g., oxides of Ni, oxides of Ni alloys, oxides of Cr, oxides of Cr alloys, $NiCrO_xN_y$, or other suitable material) for one or more of these layers in alternative embodiments of this invention. It is noted that upper contact layers 11 and/or 21 may or may not be continuous in different embodiments of this invention, depending upon their respective thickness(es).

When upper contact layers 11 and/or 21 comprise $NiCrO_x$ in certain embodiments, the Ni and Cr may be provided in different amounts, such as in the form of nichrome by weight about 80-90% Ni and 10-20% Cr. In other embodiments, sputtering targets used in sputtering layer(s) 11 and/or 21 may be 50/50 Ni/Cr, 60/40 Ni/Cr, 70/30 Ni/Cr, or any other suitable ratio. An exemplary sputtering target for depositing these layers includes not only SS-316 which consists essentially of 10% Ni and 90% other ingredients, mainly Fe and Cr, but potentially Haynes 214 alloy as well (e.g., see U.S. Pat. No. 5,688,585). Upper contact layer(s) 11 and/or 21 (e.g., of or including $NiCrO_x$) may or may not be oxidation graded in different embodiments of this invention. Oxidation grading means that the degree of oxidation in the layer(s) changes throughout the thickness of the layer(s) so that for example a contact layer may be graded so as to be less oxidized at the contact interface with the immediately adjacent IR reflecting layer than at a portion of the contact layer(s) further or more/most distant from the immediately adjacent IR reflecting layer.

The lower contact layers 7 and 17 ("lower" means the contact layers on the underneath side of the IR reflecting layers 9, 19) are of or include zinc oxide (e.g., $ZnO_x$, where x if from 0.6 to 1.2 in different embodiments, more preferably x is from 0.7 to 1.0) in preferred, but non-limiting, embodiments of this invention. For example, lower contact layer(s) 7 and/or 11 may consist essentially of zinc oxide in certain embodiments of this invention, while in other embodiments of this invention lower contact layer(s) 7 and/or 11 may include or consist essentially of $ZnAlO_x$, where x is set to a value such that the % Al (by weight) in the layer is from about 0-15%, more preferably from about 0-6%, and most preferably from about 1-4%. The use of these materials (e.g., $ZnO_x$, $ZnAlO_x$, or the like) for lower contact layer(s) 7 and/or 17 enables visible transmission of the resulting coated article to be increased (compared to if $NiCrO_x$ was used for these layers), enables sheet resistance $R_s$ and/or emissivity to be reduced, and overall enables solar performance to be improved. In $ZnO_x$ inclusive contact layer(s) 7 and/or 17, x may be set so that the layer is fully stoichiometric (e.g., ZnO), or alternatively may be set to a value from 0.4 to 0.99, more preferably from 0.7 to 0.99, and most preferably from 0.8 to 0.99 so that the layer(s) is more conductive (e.g., this can be done by reducing the amount of oxygen gas and increasing the amount of Ar gas used during a sputter coating process). Additionally, in certain embodiments of this invention, layer(s) 7 and/or 17 have an index of refraction of from 1.8 to 2.2, more preferably from about 1.9 to 2.1, so that for example layers 3 and 7 clearly represent separate and distinct films.

Surprisingly, it has been found that by using $ZnO_x$, $ZnAlO_x$, or the like for the lower contact layer(s) 7 and/or 17, while using $NiCrO_x$ for the upper contact layer(s) 11 and/or 21, the resulting coated article can achieve a combination of high visible transmission and reduced sheet resistance $R_s$, as well as acceptable durability (mechanical and/or chemical). The highly durable $NiCrO_x$ is used for the upper contact layers 11 and/or 21 for durability purposes, while the solar controlling $ZnO_x$, $ZnAlO_x$, or the like is used for the lower contact layer(s) 7 and/or 17 to improve visible transmission and/or other solar characteristics. In other words, the $NiCrO_x$ provides good durability, especially when on top of the Ag layers, and the zinc oxide inclusive contact layer(s) enable high visible transmission to be combined with low sheet resistance $R_s$ and/or good solar performance.

Second dielectric layer 13 acts as a coupling layer between the two halves of the coating 27, and is of or includes tin oxide (e.g., $SnO_2$ or some non-stoichiometric form thereof) in certain embodiments of this invention. However, other dielectric materials may instead be used for layer 13, including but not limited to silicon nitride, titanium dioxide, niobium oxide, silicon oxynitride, zinc oxide, or the like.

Third and fourth dielectric layers 23 and 25 enable the environmental resistance of the coating 27 to be improved, and are also provided for color purposes. In certain example embodiments, dielectric layer 23 may be of or include tin oxide (e.g., $SnO_2$), although other materials may instead be used. Dielectric overcoat layer 25 may be of or include silicon nitride (e.g., $Si_3N_4$) in certain embodiments of this invention, although other materials may instead be used such as titanium dioxide, silicon oxynitride, tin oxide, zinc oxide, niobium oxide, or the like.

Other layer(s) below or above the illustrated coating 27 may also be provided. Thus, while the layer system or coating 27 is "on" or "supported by" substrate 1 (directly or indirectly), other layer(s) may be provided therebetween. Thus, for example, coating 27 of FIG. 1 may be considered "on" and "supported by" the substrate 1 even if other layer(s) are provided between layer 3 and substrate 1. Moreover, certain layers of coating 27 may be removed in certain embodiments, while others may be added in other embodiments of this invention without departing from the overall spirit of certain embodiments of this invention. For example, in the FIG. 3 embodiment of this invention, a coating 27 is provided which is similar to the coating of FIG. 1 except that the upper $SnO_2$ inclusive layer 23 is not present in the FIG. 3 embodiment.

Figure 2:
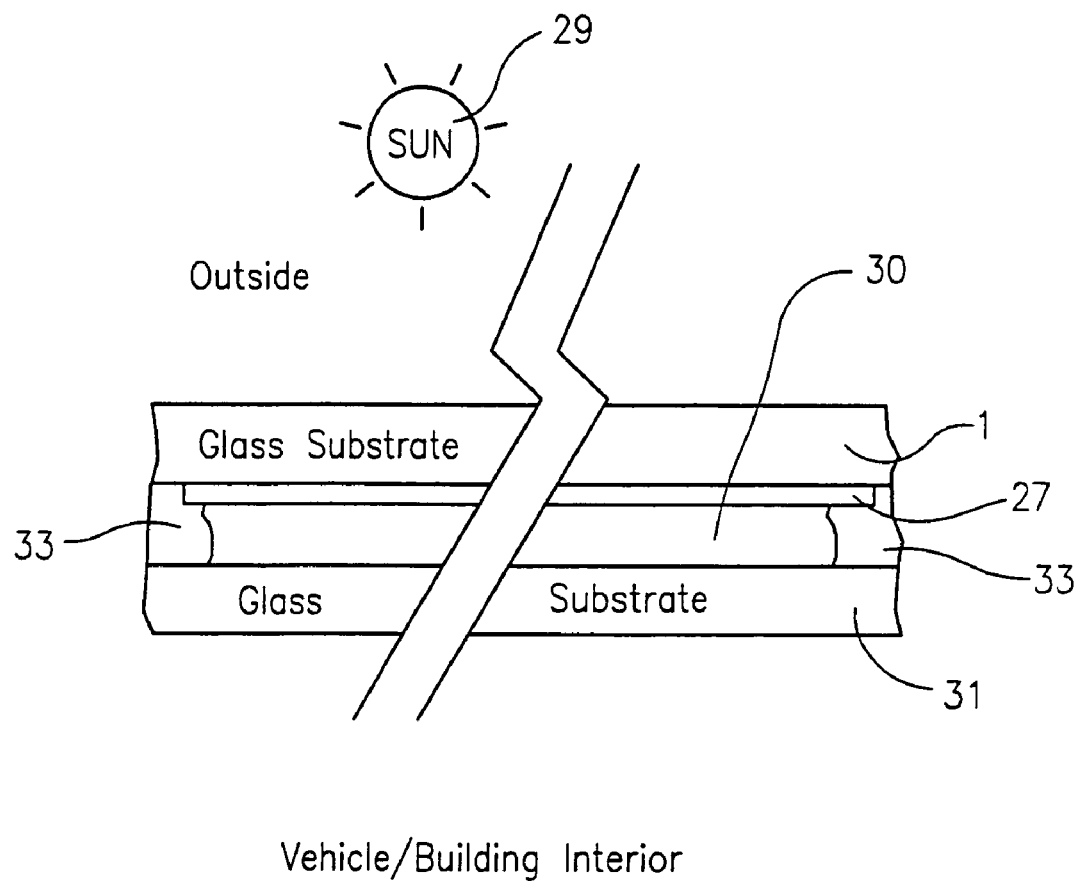
FIG. 2 is a cross sectional view of an insulating glass (IG) unit utilizing the coated article of FIG. 1 (or alternatively, the coated article of FIG. 3 or FIG. 4) according to an example embodiment of this invention.

FIG. 2 illustrates the coating or layer system 27 being utilized on surface #2 of an IG window unit. Coatings 27 according to any embodiment herein may be used in IG units as shown in FIG. 2. In order to differentiate the "inside" of the IG unit from its "outside", the sun 29 is schematically presented on the outside. The IG unit includes outside glass pane or sheet (i.e., substrate 1 from FIG. 1) and inside glass pane or sheet 31. These two glass substrates (e.g. float glass 1-10 mm thick) are sealed at their peripheral edges by a conventional sealant and/or spacer 33 and may be provided with a conventional desiccant strip (not shown). The panes may then be retained in a conventional window or door retaining frame. By sealing the peripheral edges of the glass sheets and replacing the air in insulating space (or chamber) 30 with a gas such as argon, a typical, high insulating value IG unit is formed. Optionally, insulating space 30 may be at a pressure less than atmospheric pressure in certain alternative embodiments (with or without a gas in space 30), although this of course is not necessary in all embodiments. While the inner side of substrate 1 is provided with coating 27 in FIG. 2, this invention is not so limiting (e.g., coating 27 may instead be provided on the interior surface of substrate 31 in other embodiments of this invention).

Turning back to FIG. 1, while various thicknesses may be used consistent with one or more of the objects discussed herein, exemplary preferred thicknesses and example materials for the respective layers on the glass substrate 1 in the FIG. 1-2 embodiment are as follows:

TABLE 1

(Example Materials/Thicknesses; FIG. 1 Embodiment)

| Layer | Preferred Range (Å) | More Preferred (Å) | Example (Å) |
|---|---|---|---|
| $TiO_2$ (layer 3) | 0-700 Å | 100-400 Å | 200 Å |
| $ZnO_x$ (layer 7) | 25-200 Å | 40-150 Å | 90 Å |
| Ag (layer 9) | 50-250 Å | 80-200 Å | 130 Å |
| $NiCrO_x$ (layer 11) | 5-100 Å | 15-60 Å | 30 Å |
| $SnO_2$ (layer 13) | 0-1,000 Å | 500-900 Å | 680 Å |
| $ZnO_x$ (layer 17) | 25-200 Å | 40-150 Å | 90 Å |
| Ag (layer 19) | 50-250 Å | 80-220 Å | 168 Å |
| $NiCrO_x$ (layer 21) | 5-100 Å | 15-60 Å | 30 Å |
| $SnO_2$ (layer 23) | 0-500 Å | 70-200 Å | 125 Å |
| $Si_3N_4$ (layer 25) | 0-500 Å | 120-320 Å | 220 Å |

In certain exemplary embodiments of this invention, coating/layer systems 27 according to all embodiments above have the following low-E (low emissivity) characteristics set forth in Table 2 when provided in the context of an insulating glass (IG) window unit (see FIG. 2), absent any significant heat treatment such as tempering or heat bending (although heat treatment may be performed in other embodiments of this invention). It is noted that in Table 2 the term $E_n$ means normal emissivity/emittance.

TABLE 2

Low-E Characteristics (no heat treatment)

| Characteristic | General | More Preferred | Most Preferred |
|---|---|---|---|
| $R_s$ (ohms/sq.): | <=5.0 | <=3.5 | <=2.8 |
| $E_n$: | <=0.07 | <=0.04 | <=0.03 |

Moreover, coated articles including coatings 27 according to certain exemplary embodiments of this invention have the following solar characteristics (e.g., when the coating(s) is provided on a clear soda lime silica glass substrate 1 from 2.0 to 3.2 mm thick) in monolithic form. In Table 3 below, $R_gY$ is visible reflection from the glass (g) side of the monolithic article, while $R_fY$ is visible reflection from the side of the monolithic article on which film (f) (i.e., coating 27) is located.

TABLE 3

Monolithic Solar Characteristics

| Characteristic | General | More Preferred |
|---|---|---|
| $T_{vis}$ (or TY)(Ill. C, 2 deg.): | >=70% | >=75% |
| $a^*_t$ (Ill. C, 2°): | −5.0 to 0.0 | −4.0 to −1.5 |
| $b^*_t$ (Ill. C, 2°): | −4.0 to 4.0 | 1.0 to 3.0 |
| $R_gY$ (Ill. C, 2 deg.): | 1 to 10% | 3 to 6% |
| $a^*_g$ (Ill. C, 2°): | −2.0 to 4.0 | 0.0 to 2.5 |
| $b^*_g$ (Ill. C, 2°): | −7.0 to 1.0 | −5.0 to 0.0 |
| $R_fY$ (Ill. C, 2 deg.): | 1 to 7% | 1 to 5% |
| $a^*_f$ (Ill. C, 2°): | −2.0 to 5.0 | −0.5 to 3.0 |
| $b^*_f$ (Ill. C, 2°): | −9.0 to 1.0 | −7.0 to −0.0 |
| SHGC: | <=0.49 | <=0.45 |
| SC: | <=0.56 | <=0.53 |
| $T_{ultraviolet}$: | <=0.41 | <=0.39 |
| $T_{UV\,damage\,weighted}$: | <=0.50 | <=0.48 |

Meanwhile, IG window units utilizing coatings 27 according to certain embodiments of this invention as shown in FIG. 2, have the following solar characteristics (e.g., where the coated glass substrate 1 is a clear soda lime silica glass substrate from 2 to 3.2 mm thick, and the other soda lime silica glass substrate 31 is clear and from 2 to 3.2 mm thick, absent any significant heat treatment). In Table 4 below, $R_gY$ is visible reflection from the outside or exterior of the window (i.e., from where the sun is located in FIG. 2), and $R_fY$ is visible reflection from the interior side (e.g., from within the building interior), and the a*, b* values under these respective reflection parameters also correspond to glass (g) side (i.e., from outside the window in FIG. 2) and film (f) side (i.e., from interior the window in FIG. 2).

TABLE 4

IG Unit Solar Characteristics

| Characteristic | General | More Preferred |
|---|---|---|
| $T_{vis}$ (or TY)(Ill. C, 2 deg.): | >=69% | >=70% |
| $a^*_t$ (Ill. C, 2°): | −5.0 to 0.0 | −3.5 to −1.5 |
| $b^*_t$ (Ill. C, 2°): | −2.0 to 4.0 | 1.0 to 3.0 |
| $R_gY$ (Ill. C, 2 deg.): | 7 to 13% | 9 to 11% |
| $a^*_g$ (Ill. C, 2°): | −3.0 to 2.0 | −2.0 to 0.5 |
| $b^*_g$ (Ill. C, 2°): | −5.0 to 1.0 | −4.0 to −1.0 |
| $R_fY$ (Ill. C, 2 deg.): | 7 to 14% | 10 to 12% |
| $a^*_f$ (Ill. C, 2°): | −3.0 to 2.0 | −1.5 to 0.5 |
| $b^*_f$ (Ill. C, 2°): | −5.0 to 1.0 | −4.0 to −1.5 |
| SHGC: | <=0.45 | <=0.40 |
| SC: | <=0.49 | <=0.46 |
| U-value: | 0.20 to 0.30 | 0.22 to 0.25 |
| $T_{ultraviolet}$: | <=0.36 | <=0.33 |
| $T_{UV\,damage\,weighted}$: | <=0.45 | >=0.39 |

It is noted that certain parameters can be tuned by adjusting layer thicknesses. For example, ultraviolet (UV) transmission ($T_{ultraviolet}$) can be reduced much further by adjusting dielectric thickness(es).

Figure 3:
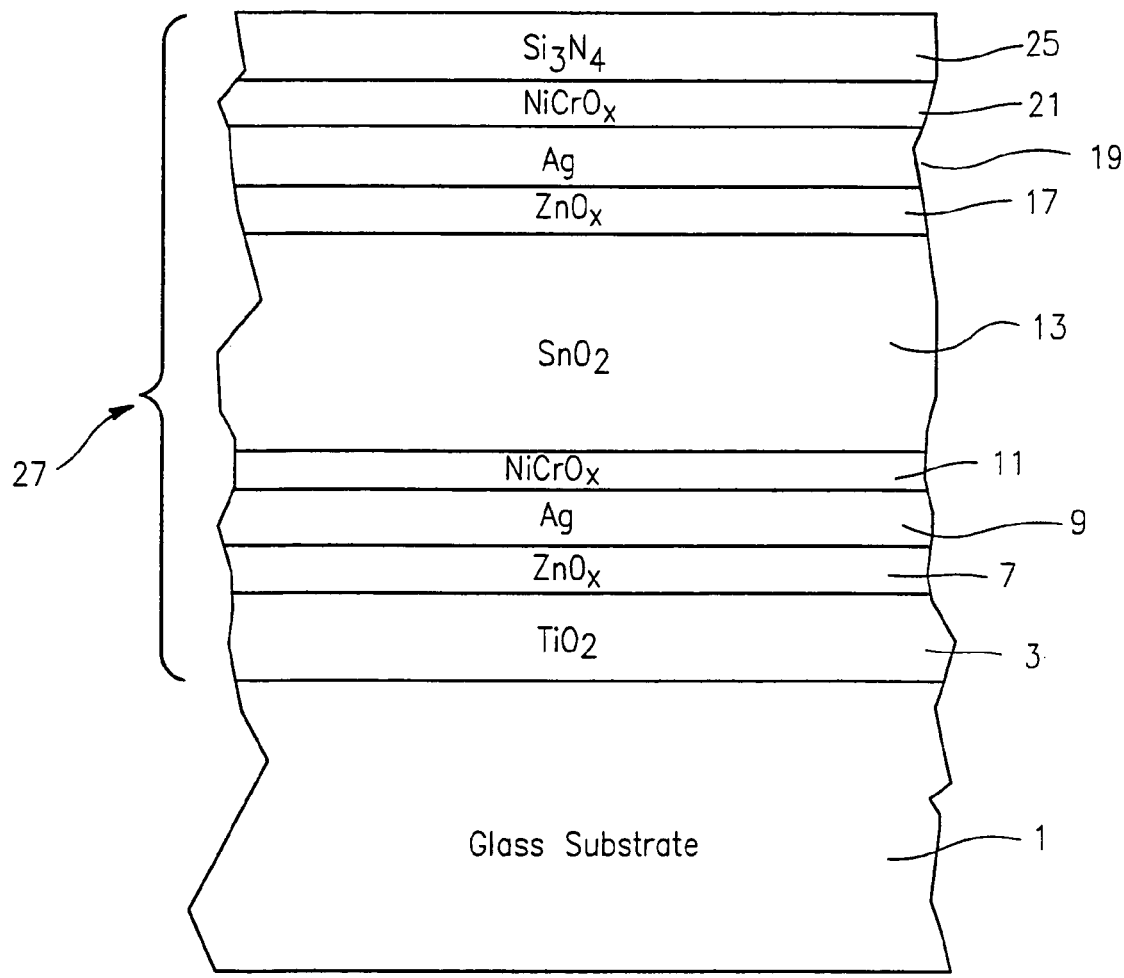
FIG. 3 is a cross sectional view of a coated article according to another example embodiment of this invention, similar to the FIG. 1 embodiment except that the tin oxide layer is not present.
Figure 4:
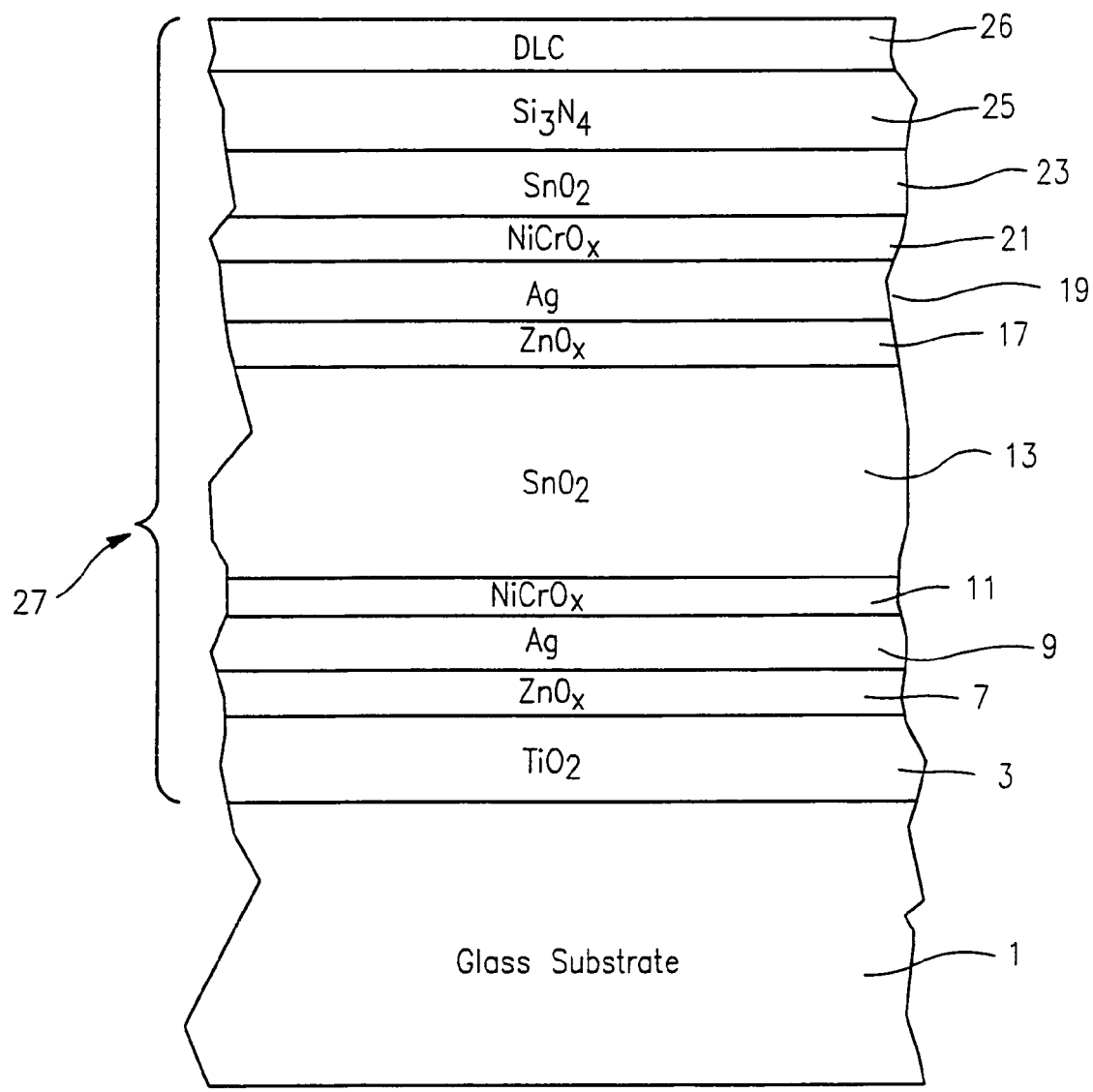
FIG. 4 is a cross sectional view of a coated article according to another example embodiment of this invention, illustrating that a diamond-like carbon (DLC) layer may be provided over top of any of the coatings or layer systems herein.

FIG. 4 is a cross sectional view of a coated article according to yet another embodiment of this invention. The FIG. 4 embodiment is the same as the FIG. 1 embodiment, except that a layer(s) of diamond-like carbon (DLC) 26 is provided as an overcoat over top of (and optionally contacting) silicon nitride layer 25 (note: the FIG. 3 embodiment may be modified in a similar manner). DLC inclusive layer 26 may be hydrophobic, hydrophillic, or neither in different embodiments of this invention. For example and without limitation, any of the DLC inclusive layers described and/or illustrated in any of U.S. Pat. Nos. 6,261,693, 6,277,480, 6,280,834, and/or 6,284,377 (all of which are hereby incorporated herein by reference) may be used as DLC inclusive layer 26 in different embodiments of this invention. DLC inclusive layer(s) 26 may be deposited on the substrate 1 as an overcoat via an ion beam deposition technique, or any other suitable deposition process.

Examples 1-2

The following example coated articles (Examples 1 and 2) were made in accordance with the FIG. 3 embodiment above (i.e., layer 23 was not present in the coating 27). In Example 1, the FIG. 3 coating or layer system 27 was sputtered onto a 3 mm thick clear soda lime silica glass substrate, using a known Leybold sputter coater (27 cathode system) at a line speed of 2.5 meters per minute. The sputter coater was set up/run as set forth below in Table 5 for Examples 1-2. Power (P) was measured in kW, current (I) in amps, and pressure (Press.) in mbar. The gas flow for Ar gas was measured in sccm, and included Ar gas flow from tuning gas segments. Thus, for example, for cathode 1, there was 350 sccm of main Ar gas flow, and all three tuning gas segments were each adjusted to output 50 sccm each of Ar gas for that cathode, which adds up to 500 sccm of Ar gas flow for cathode 1. For cathodes 1 and 2, oxygen gas flow was controlled and determined by setting all three set points (SP) for plasma emission monitor to 18 (this is what is meant by S.P. in Table 5 below). Note: the NiCr target(s) was 80/20 Ni/Cr. The coater set-up was the same for Examples 1 and 2, and monolithically the only difference between the examples being that in Example 1 the coating 27 was sputtered onto a 3 mm thick clear glass substrate, while in Example 2 the coating 27 was sputtered onto a 4 mm thick clear glass substrate.

TABLE 5

Example Coater Set-up (Examples 1-2)

| Cathode | Target | Volts (V) | P (kW) | Ar (sccm) | $O_2$ (sccm) | $N_2$ (sccm) | Press. (mbar) | I(amp) |
|---|---|---|---|---|---|---|---|---|
| #1 | Ti | 704 | 75 | 500 | SP | 75 | $2.73 \times 10^{-3}$ | 90 |
| #6 | Ti | 657 | 75 | 500 | SP | 75 | $4.87 \times 10^{-3}$ | 89 |
| #7 | ZnAl | 600 | 22 | 350 | 530 | 0 | $4.83 \times 10^{-3}$ | 45 |
| #9 | Ag | 438 | 5.5 | 150 | 0 | 0 | $2.35 \times 10^{-3}$ | 11.8 |
| #10 | NiCr | 488 | 9 | 250 | 80 | 0 | $1.43 \times 10^{-3}$ | 18.7 |
| #12 | Sn | 440 | 16 | 300 | 530 | 75 | $5.21 \times 10^{-3}$ | 34 |
| #13 | Sn | 476 | 21 | 300 | 965 | 75 | $5.28 \times 10^{-3}$ | 50 |
| #14 | Sn | 423 | 21 | 125 | 470 | 75 | $1.07 \times 10^{-2}$ | 50 |
| #15 | Sn | 434 | 22.5 | 125 | 470 | 75 | $1.07 \times 10^{-2}$ | 50 |
| #16 | Sn | 425 | 22 | 125 | 470 | 75 | $4.72 \times 10^{-3}$ | 55 |
| #18 | ZnAl | 373 | 22 | 350 | 570 | 0 | $4.71 \times 10^{-3}$ | 72 |
| #20 | Ag | 392 | 7.3 | 250 | 0 | 0 | $2.00 \times 10^{-3}$ | 18.8 |
| #21 | NiCr | 495 | 8 | 250 | 75 | 0 | $1.99 \times 10^{-3}$ | 16.5 |

TABLE 5-continued

Example Coater Set-up (Examples 1-2)

| Cathode | Target | Volts (V) | P (kW) | Ar (sccm) | $O_2$ (sccm) | $N_2$ (sccm) | Press. (mbar) | I(amp) |
|---|---|---|---|---|---|---|---|---|
| #25 | Si | 486 | 55 | 350 | 0 | 675 | $6.04 \times 10^{-3}$ | 134 |
| #26 | Si | 444 | 55 | 350 | 0 | 1200 | $6.04 \times 10^{-3}$ | 140 |

Following the sputtering of the aforesaid coating 27 on substrate 1 (3 mm thick in Example 1, and 4 mm thick in Example 2), the coated articles were measured monolithically (see Tables 6-7 below). Thereafter, the coated substrate including coating 27 and substrate 1 of each example was attached to another clear soda lime silica glass substrate 31 (the another substrate 31 was 2.3 mm thick in Example 1, and 3 mm thick in Example 2) in order to form an IG unit for each example as shown in FIG. 2. The IG units were also measured for solar properties. The measured solar properties of the monolithic units and the IG units are set forth in Tables 6-7 below:

TABLE 6

Monolithic & IG Unit Solar Characteristics (Example 1)

| Characteristic | Monolithic (Ex. 1) | IG Unit (Ex. 1) |
|---|---|---|
| $T_{vis}$ (or TY)(Ill. C, 2 deg.): | 77.8% | 71% |
| $a^*_t$ (Ill. C, 2°): | -2.9 | -2.9 |
| $b^*_t$ (Ill. C, 2°): | 2.0 | 2.0 |
| $R_g Y$ (Ill. C, 2 deg.): | 4.85% | 9.9% |
| $a^*_g$ (Ill. C, 2°): | 0.85 | -1.0 |
| $b^*_g$ (Ill. C, 2°): | -2.75 | -2.0 |
| $R_f Y$ (Ill. C, 2 deg.): | 4% | 11.5% |
| $a^*_f$ (Ill. C, 2°): | 2.5 | -0.4 |
| $b^*_f$ (Ill. C, 2°): | -6.0 | -3.0 |
| SHGC: | 0.448 | 0.394 |
| SC: | 0.52 | 0.45 |
| $T_{ultraviolet}$: | 0.38 | 0.32 |
| $T_{UV\,damage\,weighted}$: | 0.47 | 0.41 |

TABLE 7

Monolithic & IG Unit Solar Characteristics (Example 2)

| Characteristic | Monolithic (Ex. 2) | IG Unit (Ex. 2) |
|---|---|---|
| $T_{vis}$ (or TY)(Ill. C, 2 deg.): | 76.2% | 69.5% |
| $a^*_t$ (Ill. C, 2°): | -1.8 | -2.3 |
| $b^*_t$ (Ill. C, 2°): | 2.05 | 2.09 |
| $R_g Y$ (Ill. C, 2 deg.): | 5% | 9.8% |
| $a^*_g$ (Ill. C, 2°): | 1.65 | -0.1 |
| $b^*_g$ (Ill. C, 2°): | -4.8 | -2.4 |
| $R_f Y$ (Ill. C, 2 deg.): | 3.8% | 11.2% |
| $a^*_f$ (Ill. C, 2°): | 0.6 | -0.4 |
| $b^*_f$ (Ill. C, 2°): | -2.95 | -1.1 |
| SHGC: | 0.448 | 0.397 |
| SC: | 0.52 | 0.46 |
| $T_{ultraviolet}$: | 0.38 | 0.32 |
| $T_{UV\,damage\,weighted}$: | 0.47 | 0.41 |

Example 3

Example 3 is a theoretical example, and its characteristics are set forth below, including both coater set-up data and solar characteristic data. While Examples 1-2 dealt with the FIG. 2-3 embodiment, Example 3 relates to the FIG. 1-2 embodiment. Note that cathode #23 is to be used in the sputter coater to form tin oxide layer 23 as shown in FIG. 1.

TABLE 8

Example Coater Set-up (Example 3)

| Cathode | Target | Volts (V) | P (kW) | Ar (sccm) | $O_2$ (sccm) | $N_2$ (sccm) | Press. (mbar) | I(amp) |
|---|---|---|---|---|---|---|---|---|
| #1 | Ti | 704 | 75 | 500 | SP | 75 | $2.73 \times 10^{-3}$ | 90 |
| #6 | Ti | 657 | 75 | 500 | SP | 75 | $4.87 \times 10^{-3}$ | 89 |
| #7 | ZnAl | 600 | 22 | 350 | 530 | 0 | $4.83 \times 10^{-3}$ | 45 |
| #9 | Ag | 438 | 5.5 | 150 | 0 | 0 | $2.35 \times 10^{-3}$ | 11.8 |
| #10 | NiCr | 488 | 9 | 250 | 80 | 0 | $1.43 \times 10^{-3}$ | 18.7 |
| #12 | Sn | 440 | 16 | 300 | 530 | 75 | $5.21 \times 10^{-3}$ | 34 |
| #13 | Sn | 476 | 21 | 300 | 965 | 75 | $5.28 \times 10^{-3}$ | 50 |
| #14 | Sn | 423 | 21 | 125 | 470 | 75 | $1.07 \times 10^{-2}$ | 50 |
| #15 | Sn | 434 | 22.5 | 125 | 470 | 75 | $1.07 \times 10^{-2}$ | 50 |
| #16 | Sn | 425 | 22 | 125 | 470 | 75 | $4.72 \times 10^{-3}$ | 55 |
| #18 | ZnAl | 373 | 22 | 350 | 570 | 0 | $4.71 \times 10^{-3}$ | 72 |
| #20 | Ag | 392 | 7.3 | 250 | 0 | 0 | $2.00 \times 10^{-3}$ | 18.8 |
| #21 | NiCr | 495 | 8 | 250 | 75 | 0 | $1.99 \times 10^{-3}$ | 16.5 |
| #23 | Sn | 387 | 24 | 125 | 500 | 90 | $2.78 \times 10^{-3}$ | 60 |
| #25 | Si | 486 | 35 | 350 | 0 | 675 | $6.04 \times 10^{-3}$ | 72 |
| #26 | Si | 444 | 35 | 350 | 0 | 1200 | $6.04 \times 10^{-3}$ | 79 |

Following the sputtering of the aforesaid coating 27 on 2.3 mm thick substrate 1, the coated article is theoretically measured monolithically. Thereafter, the coated substrate including coating 27 and substrate 1 is to be attached to another clear soda lime silica 2.3 mm thick glass substrate 31 in order to form an IG unit for Example 3. Solar properties are as follows:

TABLE 9

Monolithic & IG Unit Solar Characteristics (Example 3)

| Characteristic | Monolithic (Ex. 3) | IG Unit (Ex. 3) |
|---|---|---|
| $T_{vis}$ (or TY)(Ill. C, 2 deg.): | 77% | 70% |
| $a*_t$ (Ill. C, 2°): | −3.25 | −2.5 |
| $b*_t$ (Ill. C, 2°): | 2.0 | 2.0 |
| $R_g Y$ (Ill. C, 2 deg.): | 5% | 10% |
| $a*_g$ (Ill. C, 2°): | 1.0 | −0.5 |
| $b*_g$ (Ill. C, 2°): | −3.0 | −2.0 |
| $R_f Y$ (Ill. C, 2 deg.): | 4% | 11.5% |
| $a*_f$ (Ill. C, 2°): | 1.5 | −0.5 |
| $b*_f$ (Ill. C, 2°): | −4.0 | −2.5 |

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_x Y$ or $R_x$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the term "transmittance" herein means solar transmittance, which is made up of visible light transmittance (TY), infrared radiation transmittance, and ultraviolet radiation transmittance. Total solar energy transmittance (TS) is then usually characterized as a weighted average of these other values. With respect to these transmittances, visible transmittance, as reported herein, is characterized by the standard CIE Illuminant C, 2 degree observer, technique at 380-720 nm; near-infrared is 720-2500 nm; ultraviolet is 300-800 nm; and total solar is 300-2500 nm. For purposes of emittance, however, a particular infrared range (i.e. 2,500-40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C., 2 degree observer.

"Emittance" (E) is a measure, or characteristic of both absorption and reflectance of light at given wavelengths. When transmittance is zero, which is approximately the case for float glass with wavelengths longer than 2500 nm, the emittance may be represented by the formula:

$$E = 1 - \text{Reflectance}_{film}$$

For architectural purposes, emittance values become quite important in the so-called "mid-range", sometimes also called the "far range" of the infrared spectrum, i.e. about 2,500-40,000 nm., for example, as specified by the WINDOW 4.1 program, LBL-35298 (1994) by Lawrence Berkeley Laboratories, as referenced below. The term "emittance" as used herein, is thus used to refer to emittance values measured in this infrared range as specified by ASTM Standard E 1585-93 for measuring infrared energy to calculate emittance, entitled "Standard Test Method for Measuring and Calculating Emittance of Architectural Flat Glass Products Using Radiometric Measurements". This Standard, and its provisions, are incorporated herein by reference. In this Standard, emittance is reported as hemispherical emittance/emissivity ($E_h$) and normal emittance/emissivity ($E_n$).

The actual accumulation of data for measurement of such emittance values is conventional and may be done by using, for example, a Beckman Model 4260 spectrophotometer with "VW" attachment (Beckman Scientific Inst. Corp.). This spectrophotometer measures reflectance versus wavelength, and from this, emittance is calculated using the aforesaid ASTM E 1585-93 which has been incorporated herein by reference.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemically resistant" or "chemical stability". Chemical durability is determined by boiling a 2"×5" sample of a coated glass substrate in about 500 cc of 5% HCl for one hour (i.e. at about 220° F.). The sample is deemed to pass this test (and thus the layer system is "chemically resistant" or is deemed to be "chemically durable" or to have "chemical durability") if the sample's layer system shows no visible discoloration or visible peeling, and no pinholes greater than about 0.003" in diameter after this one hour boil.

"Mechanical durabilility" as used herein is defined by the following tests. The test uses a Pacific Scientific Abrasion Tester (or equivalent) wherein a 2"×4"×1" nylon brush is cyclically passed over the layer system in 500 cycles employing 150 gm of weight, applied to a 6"×17" sample. In this test, if no substantial, noticeable scratches appear when viewed with the naked eye under visible light, the test is deemed passed, and the article is said to be "mechanically durable" or to have "mechanical durability".

The terms "heat treatment" and "heat treating" as used herein mean heating the article to a temperature sufficient to enabling thermal tempering, bending, or heat strengthening of the glass inclusive article. This definition includes, for example, heating a coated article to a temperature of at least about 1100 degrees F. (e.g., to a temperature of from about 550 degrees C. to 900 degrees C.) for a sufficient period to enable tempering.

The term "U-value" or "U-Factor" (synonymous with "thermal transmittance") is a term well understood in the art and is used herein according to this well known meaning. "U-value" herein is reported in terms of $BTU/hr/ft^2$/degrees F., and may be determined according to the guarded hot box method as reported in, and according to ASTM designation: C1199-91.

The term "shading coefficient" (SC) is a term well understood in the art and is used herein according to its well known meaning. It is determined according to ASHRAE Standard 142 "Standard Method for Determining and Expressing the Heat Transfer and Total Optical Properties of Fenestration Products" by ASHRAE Standards Project Committee, SPC 142, September 1995. SC may be obtained by dividing solar heat gain coefficient (SHGC) by about 0.87. Thus, the following formula may be used: SC=SHGC/0.87.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of making a coated article including a coating supported by a glass substrate, the method comprising:
providing a glass substrate;
sputtering a coating on the glass substrate, the coating comprising at least the following layers on the glass substrate:
 a layer comprising zinc oxide;
 a layer comprising silver over and contacting the layer comprising zinc oxide; and
 a layer comprising nickel chromium oxide over and contacting the layer comprising silver, wherein the layer comprising nickel chromium oxide is sputter-deposited in an atmosphere comprising oxygen gas so as to be oxidized throughout its thickness as deposited;
 a dielectric layer provided over at least the layer comprising nickel chromium oxide;
 another layer comprising zinc oxide;
 another layer comprising silver located over and contacting the another layer comprising zinc oxide;
 wherein there are no more than two layers comprising silver in the coating; and
 at least one dielectric layer provided over the another layer comprising silver; and
wherein the coating has a sheet resistance ($R_s$) of no greater than 5.0 ohms/square, and the coated article has a visible transmission of at least 70%.

2. The method of claim 1, further comprising coupling the glass substrate with the coating thereon to another substrate in making an insulating glass (IG) window unit.

3. The method of claim 1, wherein the coating has a sheet resistance ($R_s$) of no greater than 3.5 ohms/square.

4. The method of claim 1, wherein the coating has a sheet resistance ($R_s$) of no greater than 2.8 ohms/square.

5. The method of claim 1, wherein the coated article has an SHGC of no greater than 0.45.

6. The method of claim 1, wherein the coated article has an a* glass side reflectance ($a^*_g$) of from 0 to 2.5.

7. The method of claim 1, wherein the coated article has a b* glass side reflectance ($b^*_g$) of from −5.0 to 0.

8. The method of claim 1, wherein an uppermost layer of the coating comprises carbon or silicon nitride.

* * * * *